United States Patent [19]

Ryan

[11] 4,445,094

[45] Apr. 24, 1984

[54] SMSK AND MSK DEMODULATOR

[75] Inventor: Carl R. Ryan, Gilbert, Ariz.

[73] Assignee: Motorola Inc., Schaumburg, Ill.

[21] Appl. No.: 268,412

[22] Filed: May 29, 1981

[51] Int. Cl.³ ............................................. H04L 27/14
[52] U.S. Cl. ....................................... 329/50; 329/124; 375/90; 375/120
[58] Field of Search .......................... 329/50, 122, 124; 375/88, 89, 90, 120

[56] References Cited

U.S. PATENT DOCUMENTS

| | | | |
|---|---|---|---|
| 3,745,255 | 7/1973 | Fletcher et al. | 329/122 |
| 4,238,739 | 12/1980 | Mosley et al. | 329/50 |
| 4,314,206 | 2/1982 | Attwood et al. | 329/50 |
| 4,336,500 | 6/1982 | Attwood | 329/50 |
| 4,344,178 | 8/1982 | Waters | 329/50 |

Primary Examiner—Siegfried H. Grimm
Attorney, Agent, or Firm—Eugene A. Parsons

[57] ABSTRACT

An SMSK or MSK demodulator utilizing a Costas type closed loop wherein the voltage controlled oscillator is offset from the apparent carrier frequency of the SMSK or MSK signals so that the in-phase arm of the loop provides data at the output and the quadrature arm of the loop provides an indication that the loop is locked and, in combination with the data output, provides a control signal for the VCO which maintains the loop locked.

8 Claims, 5 Drawing Figures

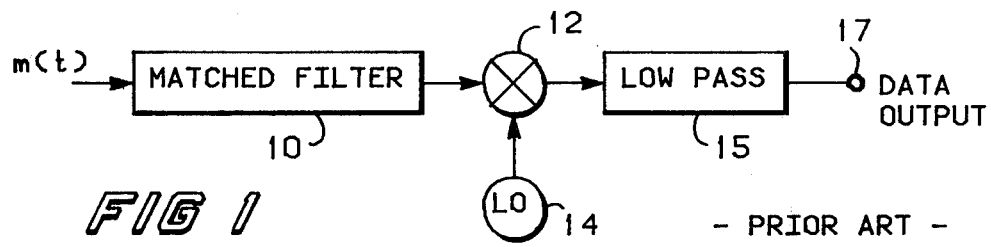
*FIG 1* — PRIOR ART —
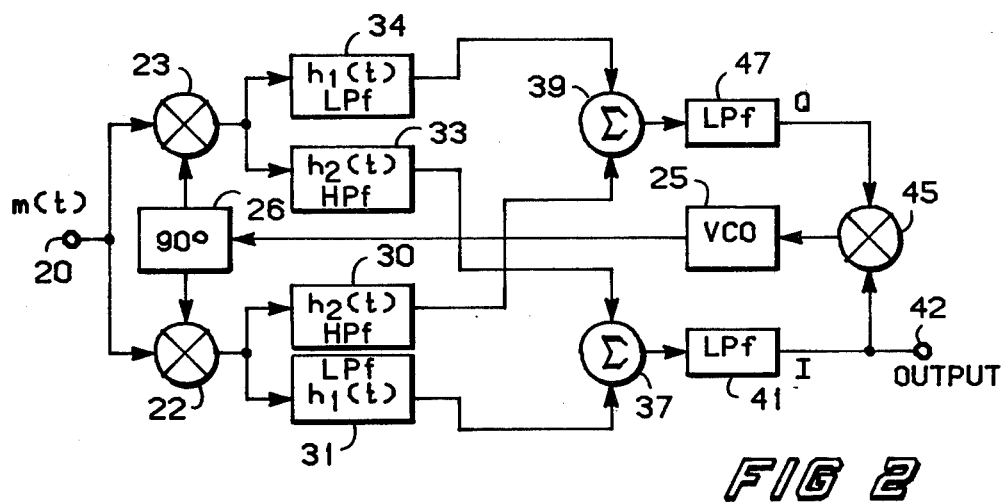
*FIG 2*
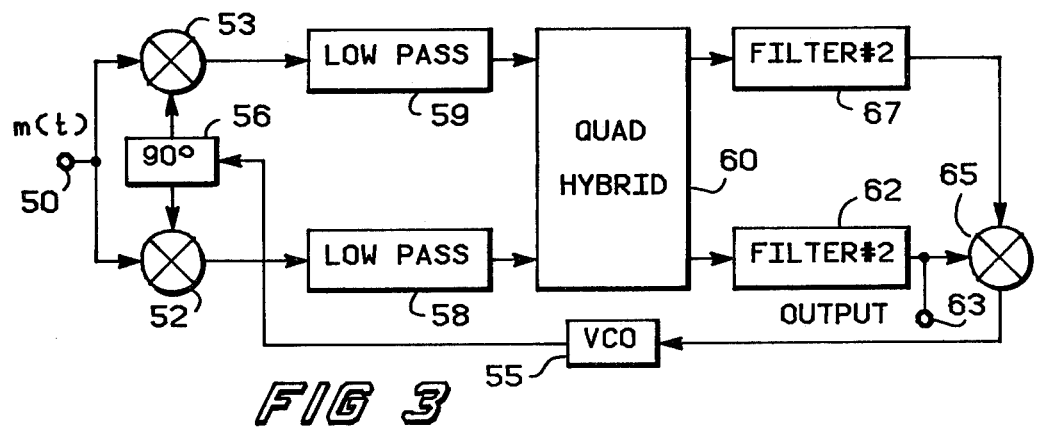
*FIG 3*

SMSK AND MSK DEMODULATOR

BACKGROUND OF THE INVENTION

Minimum shift keyed (MSK) modulation has received considerable attention over the past decade due to its potential as a bandwidth and power efficient constant envelope modulation technique. Two generic techniques for the modulation and demodulation of MSK signals are referred to as the parallel and serial methods. Both are completely equivalent in terms of bandwidth occupancy and bit error rate (BER) performance.

With the series approach, the MSK modulated signal is produced from a bi-phase modulated signal by filtering it with an appropriately designed conversion filter. This method is described in detail in a copending application entitled "Serial Minimum Shift Keyed Modulator", assigned to the same assignee and filed of even date herewith. Since the advent of serial minimum shift keyed (SMSK) modulation, the general trend has been to construct single channel demodulators which operate essentially in the reverse of the SMSK modulators. See, for example, F. Amoroso and J. A. Kivett, "Simplified MSK signaling Technique", *IEEE Transactions on Communications,* Volume Com-25, pp. 433–441, April 1977. All of the single channel SMSK demodulators require a matched filter which is relatively difficult to construct and there is no indication if the output is locked or coherent.

SUMMARY OF THE INVENTION

The present invention pertains to a demodulator for use with SMSK or MSK signals, which demodulator incorporates a Costas type closed loop wherein the reference oscillator is offset from the apparent center frequency of the input signals and a network of filters is utilized so that an in-phase channel provides data at the output thereof and a quadrature phase channel provides an indication of lock as well as a control signal for the VCO.

It is an object of the present invention to provide a new and improved SMSK or MSK demodulator utilizing a Costas type control loop.

It is a further object of the present invention to provide an SMSK or MSK demodulator utilizing a Costas type control loop including an in-phase channel for providing a data output and a quadrature channel for providing an indication of lock.

It is a further object of the present invention to provide an SMSK or MSK demodulator utilizing a simplified filtering network.

These and other objects of this invention will become apparent to those skilled in the art upon consideration of the accompanying specification, claims and drawings.

BRIEF DESCRIPTION OF THE DRAWINGS

Referring to the drawings,

FIG. 1 is a block diagram of a prior art SMSK demodulator;

FIG. 2 is a block diagram of a generalized embodiment of an SMSK or MSK demodulator incorporating the present invention;

FIG. 3 is a block diagram of a specific embodiment of an SMSK or MSK demodulator constructed in accordance with the generalized embodiment of FIG. 2;

DESCRIPTION OF THE PREFERRED EMBODIMENTS

Figure 4:
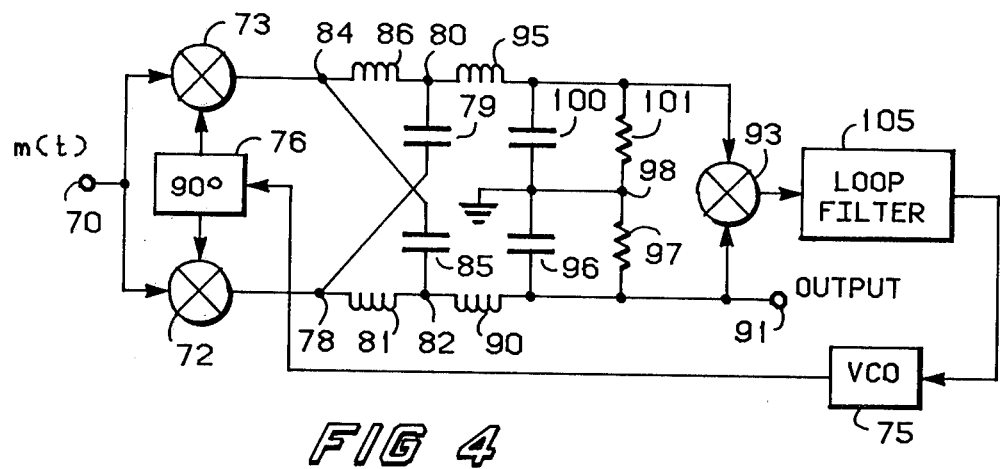
FIG. 4. is a schematic/block diagram of a specific embodiment of an SMSK or MSK demodulator constructed in accordance with the generalized block diagram of FIG. 2.

In 1976, Amoroso and Kivett (see the above referenced article) introduced a simplified means of generating an MSK signal by using a conventional bi-phase modulator followed by a linear time invarient filter. This means of generating an MSK signal has been given the name serial minimum shift keyed (SMSK) because it generates the MSK signal from a serial bit stream. The SMSK signal can be demodulated by a conventional MSK demodulator, which uses two phase detectors to detect the in-phase and quadrature signals. The output of the conventional MSK demodulator consists of two data streams, each at a data rate of $R = \frac{1}{2}T$ or a total data rate of $R_T = 1/T$.

Amoroso and Kivett (see the above referenced article) also proposed a simplified MSK demodulator, a block diagram of which is illustrated in FIG. 1. This simplified MSK demodulator includes a matched filter 10 through which the input signal is supplied to a single phase detector 12. A local oscillator 14 supplies a reference frequency for demodulation and the output signal is supplied through a low pass filter 15 to a data output terminal 17. Both the conventional MSK demodulator and the simplified MSK demodulator of FIG. 1 have the disadvantage of not being able to indicate when the demodulator is locked onto the desired signal and they require relatively complicated matched filters, which must be matched to the modulated signal.

Referring specifically to FIG. 2, a block diagram of a generalized embodiment of an SMSK or MSK demodulator incorporating the present invention is illustrated. An input terminal designated 20 is adapted to receive an input signal, which may be an MSK or SMSK signal, and is connected to an input of a first demodulator 22 and a second demodulator 23. It will of course be understood by those skilled in the art that the demodulators 22 and 23 are also commonly referred to as phase detectors, multipliers, or mixers and circuits or devices which perform these functions may be substituted therefor. A voltage controlled oscillator 25 provides a reference frequency which is supplied to a 90° hybrid circuit 26. The hybrid circuit 26 supplies an in-phase reference signal to the demodulator 22 and a quadrature reference signal (shifted 90° from the in-phase signal) to the demodulator 23. It will of course be understood that many types of circuits might be utilized to provide the in-phase and quadrature reference signals and a 90° hybrid circuit is simply one example of a circuit which will provide the desired signals. The output of the demodulator 22 is supplied to a pair of filters 30 and 31. Similarly the output of the demodulator 23 is supplied to a pair of filters 33 and 34. The output of the filters 31 and 33 are supplied to a combining, or summing, circuit 37 to form an in-phase arm or channel. The outputs of the filters 30 and 34 are supplied to two inputs of a combining, or summing, circuit 39 to form a quadrature arm or channel. The output of the combining circuit 37 is coupled through a low pass filter 41 to an output terminal 42 and to one input of a combining circuit 45. The output of the combining circuit 39 is coupled through a low pass filter 47 to a second input of the combining circuit 45. In general, the combining circuit 45 will be a multiplier type of circuit although other types of circuits might be utilized to perform the required functions. The output of the combining circuit 45 is supplied to the VCO 25 as a control signal.

For the serial MSK demodulator, illustrated in FIG. 1, the bandpass filter 10 matched to the transmitted signal is followed by the coherent demodulator 12 which is ideally frequency and phase locked to the carrier frequency of the data m(t). The actual data detection is, thus, accomplished by sampling at t-second spaced intervals and deciding that a "1" was sent if a given sample is greater than 0 and a "0" was sent otherwise. It can be shown that such a procedure results in a bit error rate performance, under ideal conditions, which is the same as that for a parallel MSK implementation; as a point of reference, a bit error rate of $10^{-6}$ requires a signal-to-noise ratio of about 10.6 dB.

FIG. 2 is an implementation of the bandpass conversion and matched filters of the serial MSK demodulator as low pass equivalents. To this end, the serial demodulator structure of FIG. 1 is replaced with the in-phase/quadrature mixer, low pass filter structures of FIG. 2. From an implementation standpoint, this approach has the following advantages features:

(1) The low pass filters may be easier to realize at high data rates than bandpass filters;

(2) Monolithic mixers can be used in the quadrature arms;

(3) The sensitivity to hardware impairments of the structure of FIG. 2 is not as great as for the conventional parallel demodulators; and (4) The demodulator can be implemented as a Costas loop type of structure, as illustrated in FIG. 2, and carrier synchronization is provided.

The impulse responses of the in-phase and quadrature arm matched filters 30, 31, 33 and 34 of FIG. 2 are $$h_1(t) = Re\ h(t) \Delta h_R(t) \quad (1)$$

and $$h_2(t) = -Im\ h(t) \Delta -h_I(t) \quad (2)$$

where h(t) denotes the complex envelope of the matched filter impulse response referenced to $f_1$, where $f_1 = f_o - \frac{1}{4}T$. Thus, the real impulse response $$h(t) = Re\ \tilde{h}(t)e^{j\omega_1 t} \quad (3)$$
$$= h_R(t) \cos \omega_1 t - h_I(t) \sin \omega_1 t$$

The spectrum of the complex envelope of an MSK signal, when referenced to the mark frequency, is $$\tilde{S}_{MSK}(f) = \frac{4T}{\pi} \frac{\cos 2\pi (fT - 0.25)}{1 - 16(fT - 0.25)^2} \quad (4)$$

Therefore, the transfer function of the low pass equivalent MSK matched filter is $$H(f) = S_{MSK}(f)e^{-j2\pi fT_d} \quad (5)$$

where $T_d$ is an arbitrary time delay. Using the Fourier transform pair $$\cos(\pi t/2T)\ (t/2T) \longleftrightarrow \frac{4T}{\pi} \frac{\cos(2\pi Tf)}{1 - 16(Tf)^2} \quad (6)$$

the complex envelope of the matched filter impulse response is found to be $$\tilde{h}(t) = F^{-1}[\tilde{H}(f)] \quad (7)$$
$$= \cos(\pi t/2T) \exp(-j\pi t/2T)\ (t/2T)$$
$$(T_d\ \text{assumed}\ 0)$$

where $T_d$ has been arbitrarily taken as zero. Separating (7) into its real and imaginary parts, we find that the impulse responses of the in-phase and quadrature channel filters are:

$$h_1(t) = h_R(t) = \cos^2(\pi t/2T)\ (t/2T) \quad (8)$$

and $$-h_2(t) = h_I(t) = \cos(\pi t/2T) \sin(\pi t/2T)\ (t/2T) \quad (9)$$

The transfer functions of the in-phase and quadrature channel filters, which are the Fourier transforms of (8) and (9), are $$H_1(f) = H_R(f) = F[h_R(t)] = \frac{T}{2}\{2\ \text{sinc}(2Tf) + \\ \text{sinc}(2Tf - 1) + \text{sinc}(2Tf + 1)\} \quad (10)$$

and $$-H_2(f) = H_I(f) = F[h_I(t)] = -j\frac{T}{2}\{\text{sinc}(2Tf - 1) - \\ \sin(2Tf + 1)\} \quad (11)$$

respectively, where $\text{sinc}(u) \Delta (\sin \pi u)/(\pi u)$. The transfer function of the low pass equivalent matched filter can be found from $$H(f) = H_R(f) + j H_I(f) = H_1(f) - j H_2(f) \quad (12)$$

and, as a check, shown to be the same as (4) with $T_d = 0$. $H_1(f)$ is even and real, $H_2(f)$ is imaginary and odd, and their quadrature sum is offset 0.25/T Hz from $f_1$, which is the reference frequency used for the low pass equivalent representation. Furthermore, the low pass transfer functions which are 2R wide between mainlobe zeros, add in phase quadrature to produce a bandpass (or low pass equivalent) transfer function which is 1.5R wide, where R = 1/T is the data rate.

The block diagram of FIG. 2 illustrates a general embodiment of a demodulator employing a Costas loop type of structure to provide carrier synchronization. The matched filters 30, 31, 33 and 34 can be formed in a variety of embodiments which fulfill the requirements set forth above. As an example, the matched filters can be implemented from open/shorted transmission lines, quadrature hybrids, (to be described in conjunction with FIG. 3) and lumped element filters (to be described in conjunction with FIG. 4). Many other types of filters might be implemented by those skilled in the art and the specific filters described herein are simply for purpose of example.

The frequency of VCO 25 is offset from the apparent carrier of the input or received signal by some predetermined amount. In the disclosed embodiments VCO 25 operates at the frequency $f_1$, which is equal to $f_o - \frac{1}{4}T$.

Since $f_o$ is the apparent carrier of the input or received signal, VCO 25 is offset by a frequency of $-\frac{1}{4}T$. This offset of VCO 25 produces an asymmetry in the matched filters resulting in the demodulated data appearing only at output terminal 42. The quadrature channel provides an indication of whether the loop is locked on the correct frequency. That is, if VCO 25 is at the correct frequency, the signal at the output of low pass filter 47 is substantially zero. The output of low pass filter 47 is combined with the output of low pass filter 41 to produce a control signal that is used to adjust VCO 25 to the correct frequency and phase.

Referring specifically to FIG. 3, a specific embodiment of the demodulation system illustrated generally in FIG. 2 is disclosed. An input terminal 50 is adapted to receive MSK or SMSK signals and is connected to an input of each of a pair of demodulators 52 and 53. A VCO 55 supplies a reference frequency signal by way of a 90° phase splitting circuit 56 to a second input of each of the demodulators 52 and 53. The circuit 56 supplies an in-phase reference frequency signal to the demodulator 52 and a 90° shifted or quadrature reference frequency signal to the demodulator 53. The outputs of the demodulators 52 and 53 are coupled through low pass filters 58 and 59, respectively, to a quadrature hybrid circuit 60. A first output of the quadrature hybrid circuit 60 is connected through a filter 62 to an output terminal 63 and to one input of a combining, or multiplying, circuit 65. A second output of the quadrature hybrid circuit 60 is connected through a second filter 67 to a second input of the combining circuit 65. The output of the combining circuit 65 is connected to a control input of the VCO 55.

The matched filter implementation of FIG. 3 makes use of an approach similar to an image rejection mixer, except that the frequency response charactristics of the quadrature hybrid circuit 60 have been chosen to give the required matched filter response for the low side of the demodulated spectrum. The low pass filters 58 and 59 provide a necessary high side noise rejection. The frequency response of the low pass filters 58 and 59 and the quadrature hybrid circuit 60 are $$H_I(f) = \cos\left\{\frac{\pi}{4}\left[1 - \sin\frac{\pi}{2}\left(\frac{f - f_o + \frac{1}{4T}}{f_m}\right)\right]\right\} \quad (13)$$

$$H_Q(f) = \cos\left\{\frac{\pi}{4}\left[1 + \sin\frac{\pi}{2}\left(\frac{f - f_o + \frac{1}{4T}}{f_m}\right)\right]\right\} \quad (14)$$

where
 f is the instantaneous frequency of m(t),
 $f_o$ is the apparent carrier frequency of m(t), and
 $f_m$ is the center frequency of quadrature hybrid 60.
The $H_I(f)$ response and the $H_Q(f)$ response each have a gain of $-3$ dB at the reference frequency of $f_o+\frac{1}{4}T$, but one peaks on the high side of this reference at a frequency of $f_o-\frac{1}{4}T+f_m$ and nulls at $f_o-\frac{1}{4}T-f_m$. A corresponding response for the other signal is obtained. The filters with the above frequency characteristics have the desired image rejection properties as required for optimum system performance, as well as providing the desired quadrature signal or controlling VCO 55 and the resulting carrier tracking.

FIG. 4 illustrates a second specific embodiment of the general embodiment illustrated in FIG. 2. An input terminal 70 is adapted to receive an MSK or SMSK signal and is connected to first inputs of each of a pair of demodulators 72 and 73. A VCO 75 is connected through a quadrature circuit 76 to second inputs of each of the demodulators 72 and 73. As previously explained, the quadrature circuit 76 supplies reference signals to the demodulators 72 and 73 which are 90° out of phase. The output of the demodulator 72 is connected to a junction 78 which is in turn coupled through a capacitor 79 to a junction 80 and through an inductance 81 to a junction 82. The output of the demodulator 73 is connected to a junction 84 which is coupled through a capacitor 85 to the junction 82 and through an inductance 86 to the junction 80. The junction 82 is coupled through an inductance 90 to an output terminal 91 and to one input of a combining circuit 93. The junction 80 is coupled through an inductance 95 to a second input of the combining circuit 93. A capacitance 96 and resistor 97 are connected in parallel between the output end of the inductance 90 and a reference potential, which in this instance is ground 98. A capacitance 100 and a resistor 101 are connected in parallel between the output end of the inductance 95 and ground 98. The output of the combining circuit 93 is connected through a loop filter 105 to the control input of the VCO 75.

The embodiment illustrated in FIG. 4 is a means for realizing an I/Q form of matched filter at lower data rates, and is commonly referred to as a lumped element circuit. The criss-crossed inductances 81, 86 and capacitors 79, 85 realize the large central lobe of the MSK spectrum, while the output low pass filters composed of inductances 90 and 95, capacitors 96 and 100 and resistors 97 and 101 attenuate the higher frequency lobes. While tedious to analyze, computer simulations have shown that very good approximations to the MSK matched filter are obtained.

A cascade of three one pole filters follow the criss-crossed LC filter of FIG. 4. This cascade represents the low pass filters inherent in monolithic mixers, summers and isolation amplifiers. The degradations for each bandwidth of this one pole cascade are tabulated below:

| 3-dB Bandwidth 1-Pole Cascade (hz) | Degradation (dB) BER = $10^{-6}$ |
|---|---|
| 0.5/T | 0.8 |
| 0.75/T | 0.38 |
| 1/T | 0.41 |

Other parameter values and configurations result in comparable degradations. For example, a double criss-cross section filter gives about the same degradation as a single criss-cross section when the parameters of both are optimized. Because of the lower number of elements, the single criss-cross is preferable.

Figure 5:
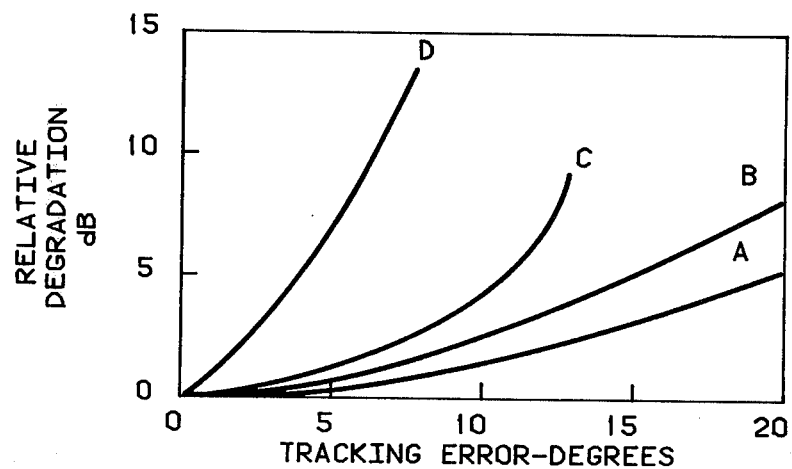
FIG. 5 is a graph showing the relative degradation versus tracking error for the demodulators of FIGS. 1 to 4.

Referring specifically to FIG. 5, graphs of the relative degradation in dB versus the tracking error, or phase error, in degrees are illustrated. In a demodulation system such as that shown in FIG. 1, phase error also perturbes the zero crossings of the output of phase detector 12; if the bit sink loop (not shown) is designed to follow this perturbation, sampling occurs at approximately $nT - \theta T/\pi$. In other words the bit sink loop would automatically tend to partially adjust the sampling time to correct for phase errors. The resulting effect on the bit error rate is illustrated in curve A of FIG. 5. In order to achieve the performance of curve A, the exact phase error must be known. Curve B illustrates the resulting effect on the bit error rate of an SMSK demodulator with tracking by bit sink loop, as illustrated in FIGS. 2, 3 and 4. Curve C illustrates the bit error rate for an SMSK demodulator without tracking by a bit sink loop and curve D illustrates the bit error rate of a QPSK conventional demodulator. It can be seen from FIG. 5 that the present SMSK demodulator with tracking loop has substantial advantages over conventional demodulators and, in addition, the circuitry is much simpler and the components can be constructed with a greater tolerance. In addition, the circuit automatically indicates when the system is locked onto the correct signal.

While I have shown and described specific embodiments of this invention, further modifications and improvements will occur to those skilled in the art. I desire it to be understood, therefore, that this invention is not limited to the particular forms shown and I intend in the appended claims to cover all modifications which do not depart from the spirit and scope of this invention.

I claim:

1. A demodulation system for demodulating input minimum-shift keyed and serial minimum-shift keyed signals comprising:
    (a) a variable reference oscillator having an output with a reference signal thereon offset from an apparent carrier of the input signals and a control input for controlling the frequency of the reference signal;
    (b) in-phase and quadrature demodulators connected to receive input signals and quadrature reference signals from said reference oscillator, said demodulators providing outputs in in-phase and quadrature arms of the system;
    (c) in-phase filtering means quadrature filtering means in the in-phase and quadrature arms providing a demodulated frequency spectrum, each filtering means including high-pass circuits for providing a predetermined frequency response for the low side of the demodulated spectrum and low pass circuits for providing noise rejection for the high side of the demodulated spectrum; and
    (d) combining means having first and second inputs coupled to the in-phase and quadrature filtering means and an output coupled to the control input of said variable reference oscillator, said combining means combining the output signals of the filtering means to produce a control signal for controlling said variable reference oscillator so that the output signal of the quadrature filtering means is substantially zero.

2. A demodulator system as claimed in claim 1 wherein the in-phase filtering means include lumped elements of capacitance and inductance and the combining means include junctions of said elements.

3. A demodulation system for demodulating input minimum-shift keyed and serial minimum-shift keyed signals comprising:
    (a) a variable reference oscillator having an output with a reference signal thereon offset from an apparent carrier or centroid of the input signals and a control input for controlling the frequency of the reference signal;
    (b) in-phase and quadrature demodulators connected to receive input signals and quadrature reference signals from said reference oscillator, said demodulators providing outputs in in-phase and quadrature arms of the system;
    (c) first filtering means coupled to the outputs of each of said demodulators for providing a predetermined frequency response for the low side of the demodulated spectrum for the in-phase and quadrature arms;
    (d) second filtering means coupled to the outputs of each of said demodulators for providing noise rejection for the high side of the demodulated spectrum for the in-phase and quadrature arms;
    (e) first combining means coupled to said first and second filtering means for combining signals for the in-phase arm;
    (f) second combining means coupled to said first and second filtering means for combining signals for the quadrature arm;
    (g) third combining means having two inputs and an output coupled to the control input of said variable reference oscillator;
    (h) a first low pass filter coupling the combined signals from said first combining means to one of the inputs of said third combining means and to a data output for the system; and
    (i) a second low pass filter coupling the combined signals from said second combining means to the other of the inputs of said third combining means.

4. A demodulation system as claimed in claim 3 wherein the offset of the variable reference oscillator and the first and second filtering means are designed so that the combined signals coupled by the second low pass filter are substantially zero.

5. A demodulation system as claimed in claim 3 wherein the first filtering means has an impulse response $$H_1(t) = \cos^2(\pi t/2T) \quad (t/2T)$$

and the second filtering means has an impulse response $$-H_2(t) = \cos(\pi t/2T) \sin(\pi t/2T) \quad (t/2T)$$

where:
T is the bit period of data,
t is the instantaneous time, and
$(t)\Delta 1 - \tfrac{1}{2} \leq t \leq \tfrac{1}{2}$ and is zero otherwise.

6. A demodulation system as claimed in claim 3 wherein the first and second filtering means and the first and second combining means include first and second low pass filters coupled to first and second inputs of a quadrature hybrid circuit.

7. A demodulation system as claimed in claim 6 wherein the first and second low pass filters and the quadrature hybrid circuit are constructed so that the frequency response of the first low pass filter and the quadrature hybrid circuit is $$H_I(f) = \cos\left\{ \frac{\pi}{4}\left[1 - \sin\frac{\pi}{2}\left(\frac{f - f_o + \frac{1}{4T}}{f_m}\right)\right]\right\}$$

and the frequency response of the second low pass filter and the quadrature hybrid circuit is $$H_Q(f) = \cos\left\{\frac{\pi}{4}\left[1 + \sin\frac{\pi}{2}\left(\frac{f - f_o + \frac{1}{4T}}{f_m}\right)\right]\right\}$$

where
- f is the instantaneous frequency of the input signal,
- $f_o$ is the apparent center frequency of the input signal, and
- $f_m$ is the center frequency of the quadrature hybrid circuit.

8. In a demodulation system for demodulating input minimum-shift keyed and serial minimum-shift keyed signals a method of demodulation comprising the steps of:

(a) receiving the input signals;

(b) providing a variable demodulation signal offset in frequency from an apparent carrier of the input signal;

(c) multiplying the input signals by in-phase and quadrature components of the demodulation signal;

(d) filtering and combining the product of the input signals and the in-phase component and the product of the input signals and the quadrature component to provide data signals at an output of an in-phase channel and quadrature signals indicative of phase errors between the input signals and the variable demodulation signal at an output of a quadrature channel;

(e) combining the signals at the outputs of the in-phase and quadrature channels to provide a control signal; and (f) utilizing the control signal to control the variable demodulation signal to reduce the quadrature signal at the output of the quadrature channel to substantially zero.

* * * * *